(12) United States Patent
Whangbo et al.

(10) Patent No.: US 8,553,192 B2
(45) Date of Patent: Oct. 8, 2013

(54) LIQUID CRYSTAL DISPLAY

(75) Inventors: Sang-Woo Whangbo, Seoul (KR); Yong-Su Lee, Hwaseong-si (KR); Doo-Hee Jung, Seoul (KR); Cheol-Gon Lee, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 339 days.

(21) Appl. No.: 13/090,186

(22) Filed: Apr. 19, 2011

(65) Prior Publication Data

US 2012/0133855 A1    May 31, 2012

(30) Foreign Application Priority Data

Nov. 29, 2010 (KR) .................. 10-2010-0119771

(51) Int. Cl.
    *G02F 1/1343* (2006.01)
(52) U.S. Cl.
    USPC .......................................... 349/144; 349/106

(58) Field of Classification Search
    None
    See application file for complete search history.

(56) References Cited

U.S. PATENT DOCUMENTS

| | | | |
|---|---|---|---|
| 6,040,882 A * | 3/2000 | Jun et al. ................. | 349/39 |
| 2007/0153142 A1* | 7/2007 | Nam et al. ............... | 349/114 |

* cited by examiner

*Primary Examiner* — Richard Kim
(74) *Attorney, Agent, or Firm* — H.C. Park & Associates, PLC

(57) ABSTRACT

A liquid crystal display (LCD) is provided that includes: a first substrate; a gate line formed on the first substrate; a data line intersecting the gate line to define a pixel; a thin-film transistor (TFT) connected to the gate line and the data line and formed in the pixel; a sustain electrode line including a first sustain electrode that passes through the pixel, so as to divide the pixel into a first region and a transparent second region, and a second sustain electrodes that extend perpendicularly from the first sustain electrode; and a first pixel electrode connected to the TFT, disposed in the first region.

22 Claims, 14 Drawing Sheets

LIQUID CRYSTAL DISPLAY

This application claims priority from Korean Patent Application No. 10-2010-0119771 filed on Nov. 29, 2010, which is hereby incorporated by reference for all purposes as if fully set forth herein.

BACKGROUND OF THE INVENTION

1. Field of the Invention

Exemplary embodiments of the present invention relate to a liquid crystal display (LCD).

2. Description of the Related Art

Liquid crystal displays (LCDs) are one of the most widely used type of flat panel displays. Generally, an LCD includes a pair of display panels having electrodes, and a liquid crystal layer interposed between the display panels. An LCD displays a desired image by is applying voltages to the electrodes, to rearrange liquid crystal molecules of the liquid crystal layer, to thereby control the amount of light that passes through the liquid crystal layer.

Specifically, an LCD includes: an upper display panel having a common electrode, color filters, a black matrix, etc.; a lower display panel having thin-film transistors (TFTs), pixel electrodes, etc.; and a liquid crystal material having an anisotropic dielectric constant and that is injected between the upper and lower display panels. In the LCD, different electric potentials are applied to the pixel electrodes and the common electrode to adjust the intensity of an electric field formed in the liquid crystal material. Accordingly, the molecular arrangement of the liquid crystal material is changed, thereby controlling the amount of light that passes through a transparent insulating substrate. As a result, a desired image is displayed on the LCD.

A lower display panel includes gate lines transmitting scanning signals, data lines transmitting image signals, TFTs connected to the gate lines and the data lines, and pixel electrodes connected to the TFTs, respectively. The gate lines intersect the data lines to define a plurality of pixels, and the TFTs are provided in each of the pixels, respectively. A TFT includes a gate electrode that is part of a gate line, a semiconductor layer that forms a channel, a source electrode that is part of a data line, a drain electrode, and the like. A TFT is a switching element that selectively allows an image signal received from a data line to be transmitted to a pixel electrode, in response to a scanning signal received from a gate line.

Recently, transparent display devices have been developed that can be operated with a low power consumption and that provide improved aesthetic design. An image projected onto such a transparent display device is viewable simultaneously from opposing sides of the display device.

Of various transparent display devices, a display device using an organic light-emitting diode (OLED) has a transmittance of 30 to 40%. Further, an image is viewable from both directions of the display device, and an object located behind the display device is viewable. Unlike other display devices including OLED displays, LCDs generally cannot be implemented as transparent displays, due to their low transmittance.

SUMMARY OF THE INVENTION

Aspects of the present invention provide a liquid crystal display (LCD) having improved transparency and display qualities, due to the improved configuration of a pixel region.

However, the aspects of the present invention are not restricted to the one set forth herein. The above and other aspects of the present invention will become more apparent to one of ordinary skill in the art to which the present invention pertains, by referencing the detailed description of the present invention given below.

According to an aspect of the present invention, there is provided an LCD including: a first substrate; a gate line formed on the first substrate; a data line insulated from the gate line and intersecting the gate line, so as to at least partially define a pixel; a thin-film transistor (TFT) connected to the gate line and the data line and formed in the pixel; a sustain electrode line, including a first sustain electrode that passes through the pixel, and a second sustain electrode that extends from the first sustain electrode in a direction perpendicular to the first sustain electrode; and a first pixel electrode connected to the TFT, formed in a region surrounded by the sustain electrode line, and partially overlapping the sustain electrode line. The sustain electrode line partitions the pixel into a first region including the first pixel electrode and a transparent region. A second pixel electrode may be disposed in the second region.

Additional features of the invention will be set forth in the description which follows, and in part will be apparent from the description, or may be learned by practice of the invention. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
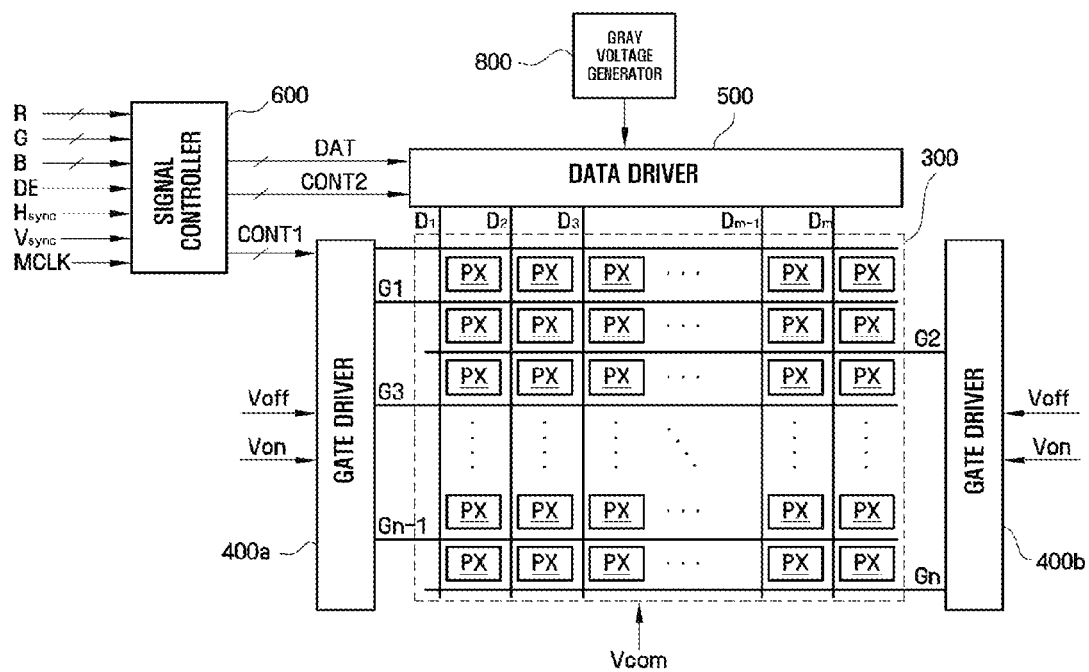
FIG. 1 is a block diagram of a liquid crystal display (LCD), according to exemplary embodiments of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the is invention to those skilled in the art, and the present invention will only be defined by the appended claims. In the drawings, sizes and relative sizes of layers and regions may be exaggerated for clarity.

It will be understood that when an element or layer is referred to as being "on" or "connected to" another element or layer, the element or layer can be directly on or connected to another element or layer, or intervening elements or layers may also be present. In contrast, when an element is referred to as being "directly on" or "directly connected to" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures.

Exemplary embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein, but are to include deviations in shapes that result, for example, from manufacturing. Thus, the regions illustrated in the figures are schematic in nature and their shapes are not intended to illustrate the actual shape of a region of a device and are not intended to limit the scope of the invention.

The term "thin-film transistor (TFT) substrate" as used herein refers to a substrate comprising at least one TFT, but does not preclude the intervention of another structure between the TFT and the substrate, or the presence of additional structure formed thereon. In addition, the term "transparent region" refers to a region through which most or all of the light emitted from a surface can pass.

Figure 2:
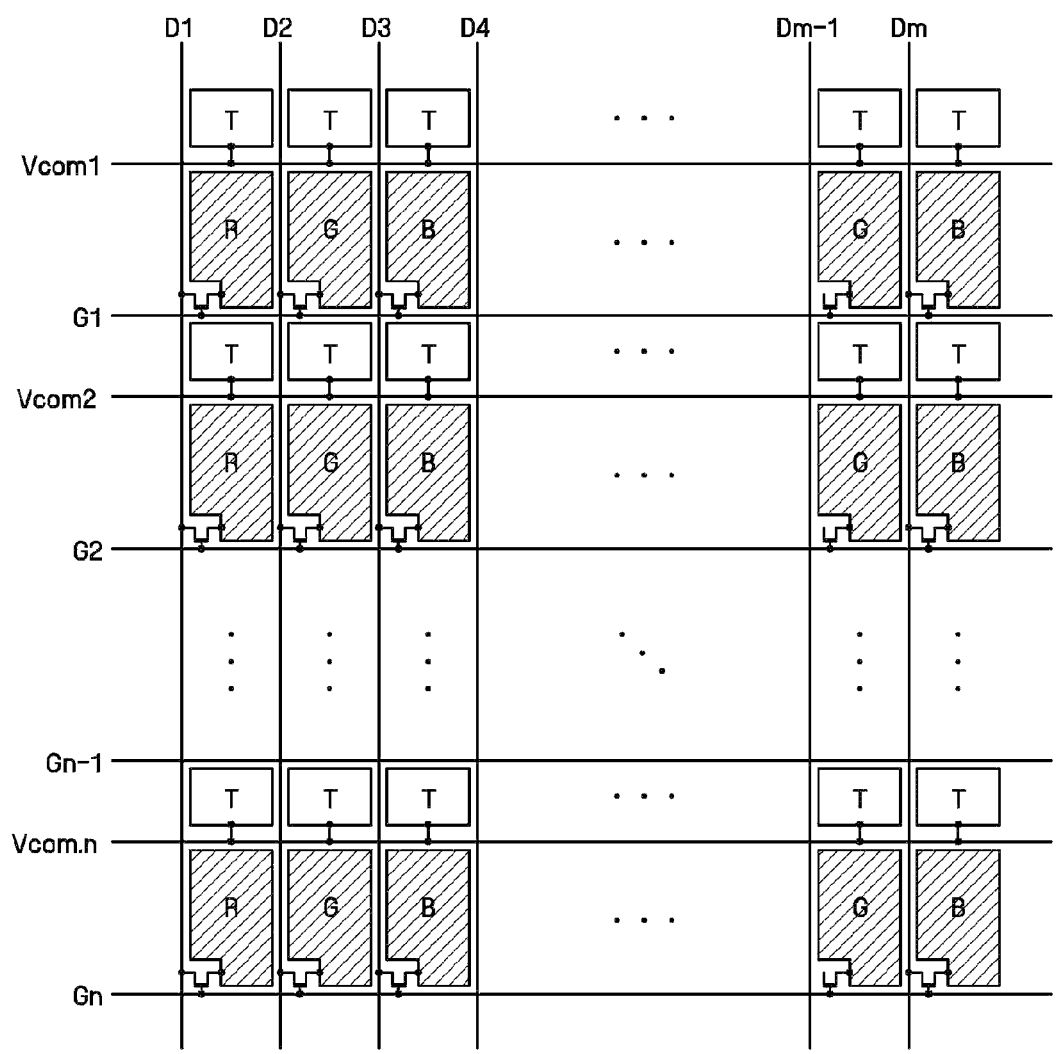
FIG. 2 is a schematic view of a pixel array of the LCD shown in FIG. 1.

FIG. 1 is a block diagram of an LCD, according to an exemplary embodiment of the present invention. FIG. 2 is a schematic view of a pixel array of the LCD shown in FIG. 1. Referring to FIG. 1, the LCD includes a liquid crystal panel assembly 300. A pair of gate drivers 400a and 400b, and a data driver 500 are connected to the liquid crystal panel assembly 300. A gray voltage generator 800 is connected to the data driver 500. A signal controller 600 is included to control the above elements.

An equivalent circuit of the liquid crystal panel assembly 300 includes a plurality of display signal lines and a plurality of pixels PX connected to the display signal lines and arranged substantially in a matrix. The liquid crystal panel assembly 300 includes opposing lower and upper display panels and a liquid crystal layer interposed between the lower and upper display panels.

The display signal lines are formed on the lower display panel. The display signal lines include a plurality of gate lines G1 and Gn for transmitting gate signals, and a plurality of data lines D1 through Dm for transmitting data signals. The gate lines G1 through Gn extend substantially in a row direction and are substantially parallel to each other. The data lines D1 through Dm extend substantially in a column direction and are substantially parallel to each other.

Each pixel PX includes a switching device connected to corresponding ones of the is gate lines G1 through Gn and the data lines D1 through Dm, and a liquid crystal capacitor connected to the switching device. The switching device in each pixel PX may be a TFT, that is, a three-terminal device that includes a control terminal connected to a corresponding one of the gate lines G1 through Gn, an input terminal connected to a corresponding one of the data lines D1 through Dm, and an output terminal connected to the liquid crystal capacitor.

The gate drivers 400a and 400b are connected to the gate lines G1 through Gn and transmit gate signals, each being either a gate on voltage Von or a gate off voltage Voff, to the gate lines G1 through Gn. In FIG. 1, the gate drivers 400a and 400b are disposed on left and right sides of the liquid crystal panel assembly 300 and are connected to odd-numbered and even-numbered gate lines G1 through Gn, respectively. However, the gate drivers 400a and 400b may also all be disposed on one side of the liquid crystal panel assembly 300. Alternatively, the gate drivers 400a and 400b may be mounted on the lower display panel of the liquid crystal panel assembly 300, in the form of integrated circuits.

The gray voltage generator 800 generates a gray voltage related to the transmittance of a pixel PX. The gray voltage is applied to each pixel PX and has a positive or negative value, with respect to a common voltage Vcom.

The data driver 500 is connected to the data lines D1 through Dm and applies a gray voltage received from the gray voltage generator 800 to a pixel PX, as a data voltage. When the gray voltage generator 800 provides a reference gray voltage instead of specific gray level voltages, the data driver 500 divides the reference gray voltage to generate gray voltages for all gray levels and selects a data voltage from the generated gray voltages.

The gate drivers 400a and 400b and/or the data driver 500 may be integrated on the liquid crystal panel assembly 300, together with the display signal lines G1 through Gn and D1 through Dm and the TFT switching devices. Otherwise, the gate drivers 400a and 400b and/or the data driver 500 may be mounted on a flexible printed circuit film (not shown) and attached to the liquid crystal panel assembly 300, in the form of a tape carrier package. The signal controller 600 controls the operations of the gate drivers 400a and 400b, the data driver 500, and the like.

Referring to FIG. 2, the length (taken vertically) of each pixel PX is longer than the width (taken horizontally) thereof. Therefore, red, green, and blue color filters are arranged in a vertical stripe pattern. That is, the red, green, and blue color filters are sequentially repeated along each of the gate lines G1 through Gn. Each pixel PX may have various shapes other than as shown in FIG. 2.

Each pixel PX may be at least partially defined by the corresponding gate lines data lines. Each pixel PX may be partitioned by a sustain electrode line. That is, a sustain electrode line (e.g., Vcom2) is interposed between every two gate lines (e.g., G1 and G2), thereby partitioning each pixel PX into two regions, i.e., a first region including R, G, and B sub-pixels, and a transparent second region T. Accordingly, the LCD may have a higher transmittance than conventional LCDs, and thus, a transparent display can be realized.

The LCD, according to an exemplary embodiment of the present invention, will now be described with reference to FIGS. 3A through 5B. The LCD includes a lower display panel 100 (see FIG. 5B), an upper display panel 200 (see FIG. 5B) facing the lower display panel 100, and a liquid crystal layer (not shown) interposed between the lower and upper display panels 100 and 200.

Figure 3A:
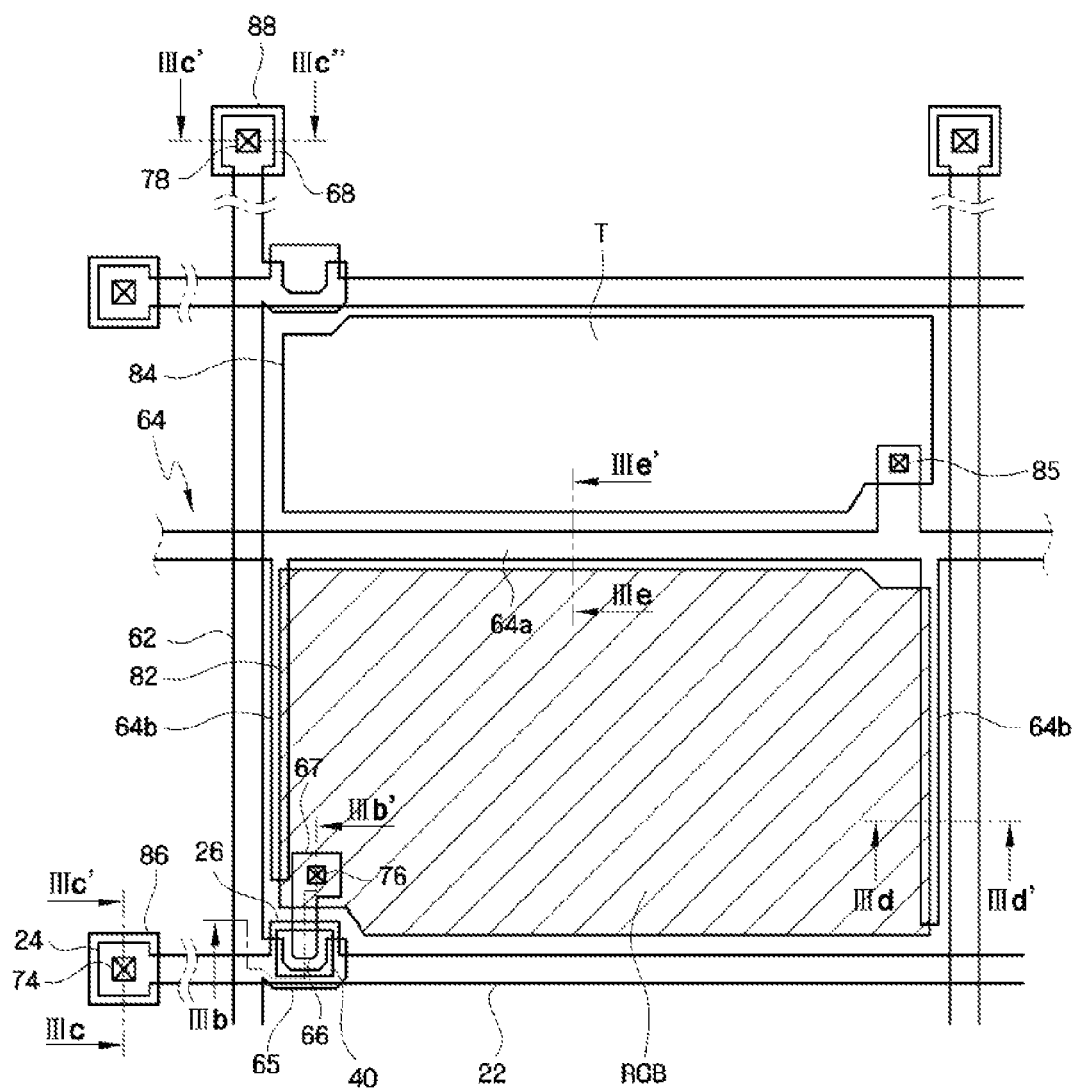
FIG. 3A is a layout view of a lower display panel of the LCD, according to a first exemplary embodiment of the present invention.
Figure 3B:
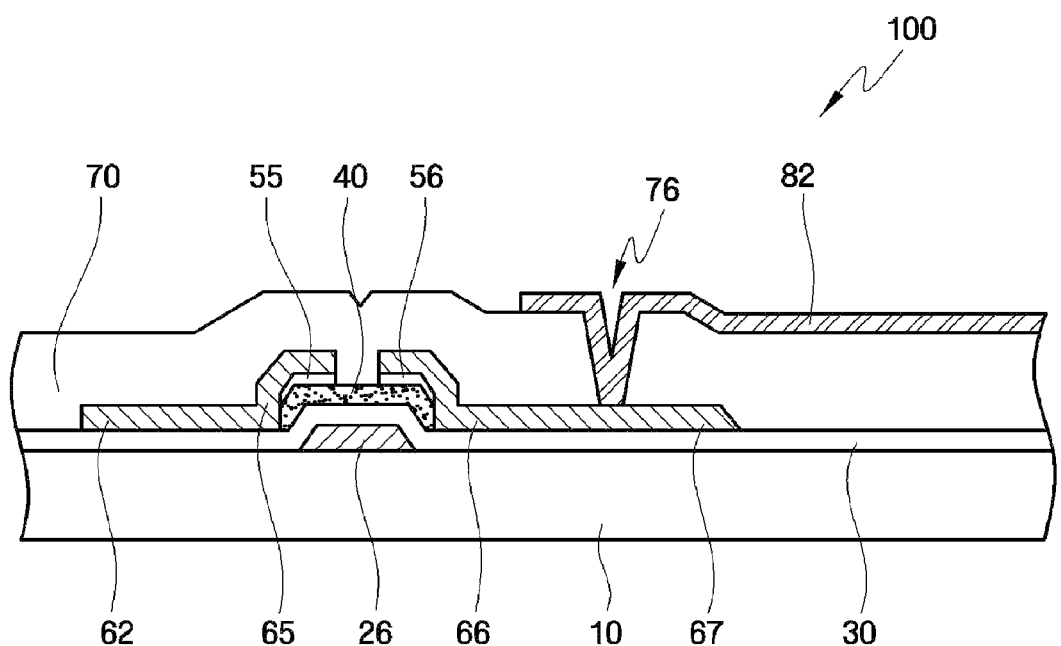
FIG. 3B is a cross-sectional view of the lower display panel taken along the line IIIb-IIIb' of FIG. 3A.
Figure 3C:
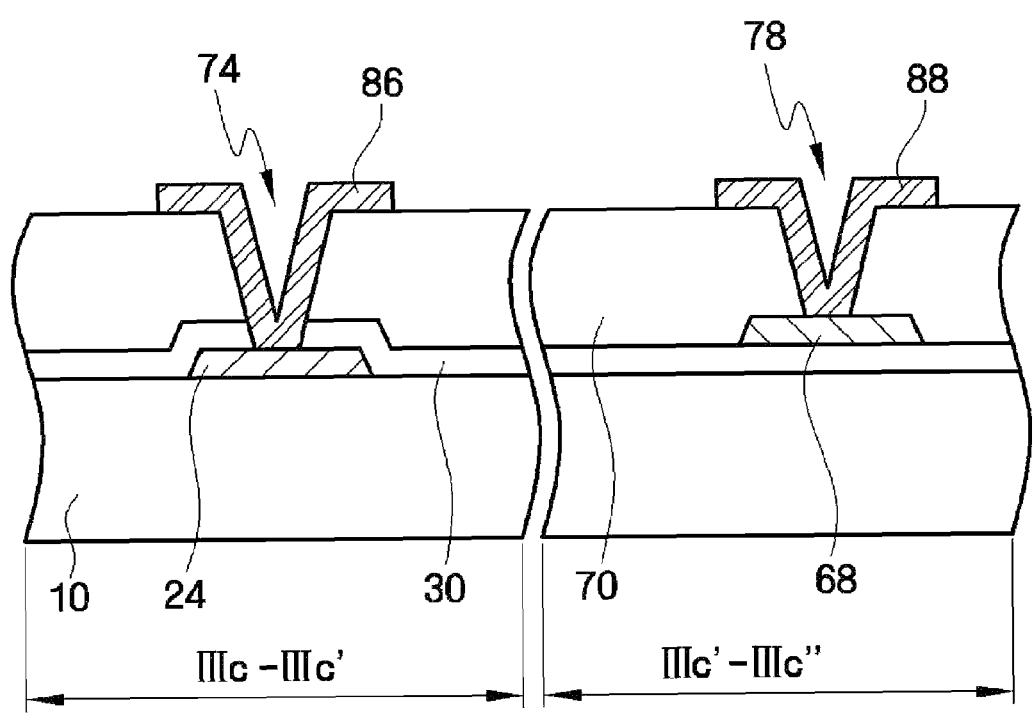
FIG. 3C is a cross-sectional view of the lower display panel taken along the line IIIc-IIIc' of FIG. 3A.
Figure 3D:
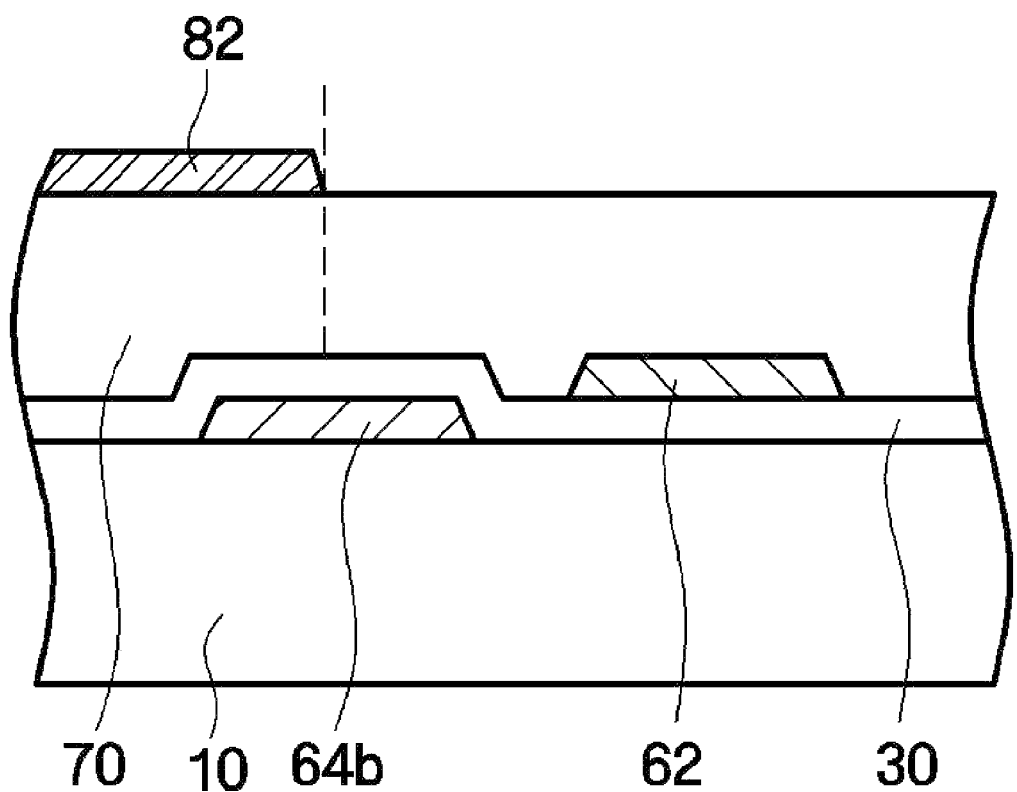
FIG. 3D is a cross-sectional view of the lower display panel taken along the line IIId-IIId' of FIG. 3A.
Figure 3E:
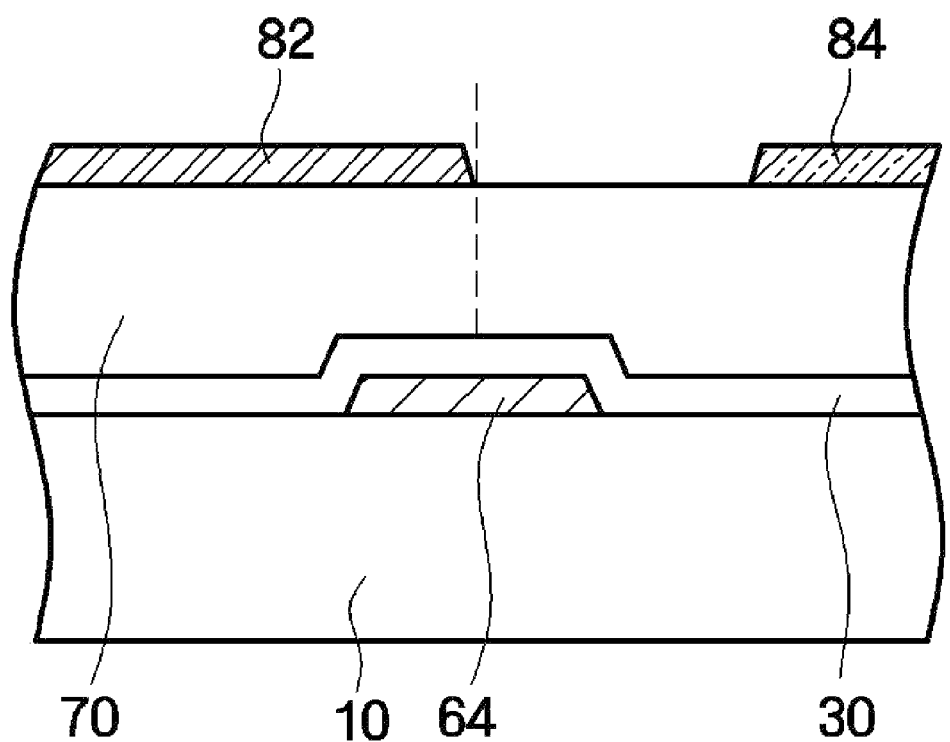
FIG. 3E is a cross-sectional view of the lower display panel taken along the line IIIe-IIIe' of FIG. 3A.
Figure 4:
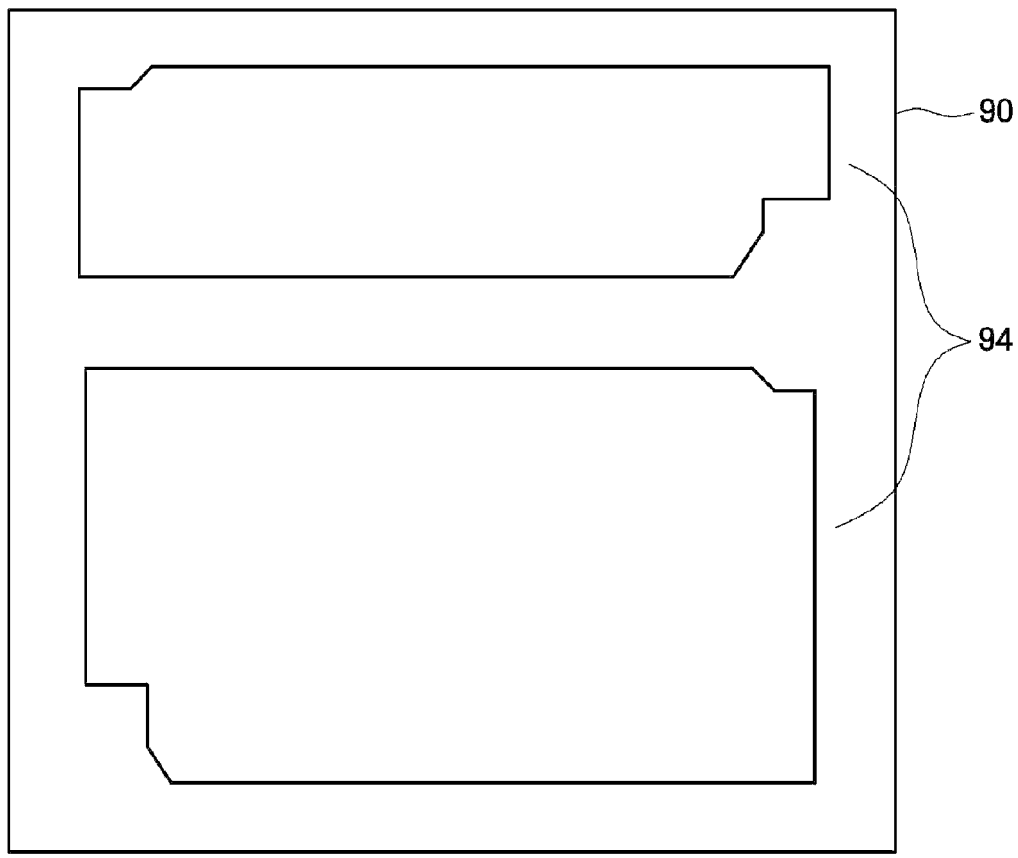
FIG. 4 is a layout view of an upper display panel of the LCD, according to the first exemplary embodiment of the present invention.
Figure 5A:
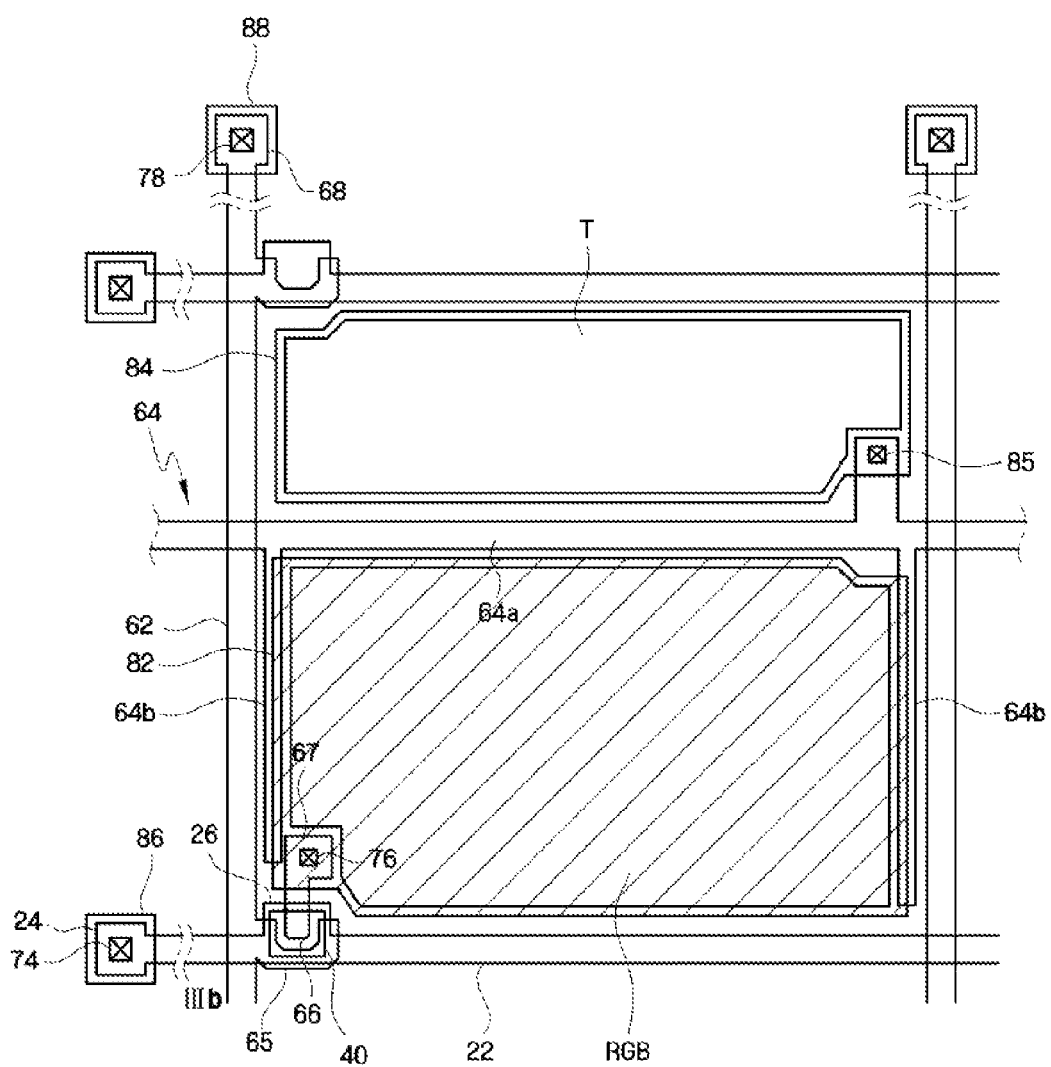
FIG. 5A is a layout view of the LCD according to the first exemplary embodiment of the present invention, including the lower display panel of FIG. 3A and the upper display panel of FIG. 4.
Figure 5B:
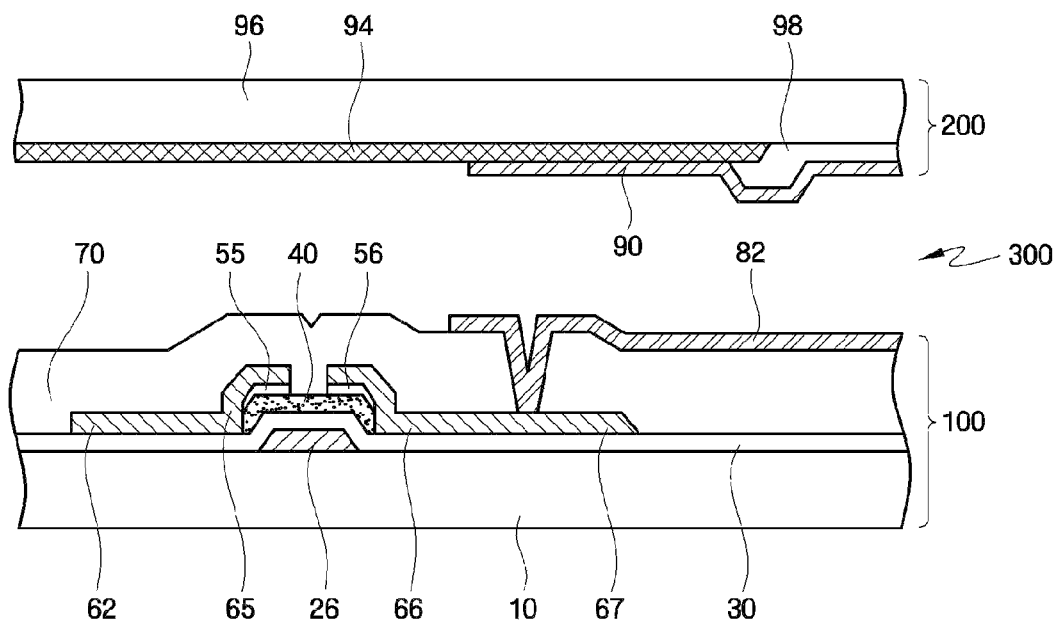
FIG. 5B is a cross-sectional view of the LCD device of FIG. 5A.

FIG. 3A is a layout view of the lower display panel 100. FIG. 3B is a cross-sectional view of the lower display panel 100 taken along the line IIIb-IIIb' of FIG. 3A. FIG. 3C is a cross-sectional view of the lower display panel 100 taken along the line IIIc-IIIc' of FIG. 3A. FIG. 3D is a cross-sectional view of the lower display panel 100 taken along the line IIId-IIId' of FIG. 3A. FIG. 3E is a cross-sectional view of the lower display panel 100 taken along the line IIIe-IIIe' of FIG. 3A. FIG. 4 is a layout view of the upper display panel 200 of the LCD according to the first exemplary embodiment of the present invention. FIG. 5A is a layout view of the LCD, including the lower display panel 100 and the upper display panel 200. FIG. 5B is a cross-sectional view of the LCD of FIG. 5A.

The lower display panel 100 will now be described in detail with reference to FIGS. 3A through 3E. A gate line 22 extends substantially in a horizontal direction on an insulating substrate 10. A gate electrode 26 protrudes from the gate line 22. A gate line end 24 is formed at an end of the gate line 22 and receives a gate signal from another layer or an external source and delivers the received gate signal to the gate line 22. The gate line end 24 has an increased width for connection with an external circuit. The gate line 22, the gate electrode 26, and the gate line end 24 are collectively referred to as gate wirings.

The gate wirings (22, 24, and 26) may be formed of an aluminum (Al)-based metal, such as aluminum and an aluminum alloy, a silver (Ag)-based metal, such as silver and a silver alloy, a copper (Cu)-based metal, such as copper and a copper alloy, a molybdenum (Mo)-based metal, such as molybdenum and a molybdenum alloy, chrome (Cr), titanium (Ti), or tantalum (Ta).

In addition, the gate wirings (22, 24, and 26) may have a multi-film structure including two conductive films (not shown) having different physical characteristics. One of the two conductive films may be formed of metal with a low resistivity, such as an aluminum-based metal, a silver-based metal, or a copper-based metal, in order to reduce a signal delay and/or a is voltage drop of the gate wirings (22, 24, and 26). The other one of the conductive films may be formed of a different material, in particular, a material having superior contact characteristics with indium tin oxide (ITO) and indium zinc oxide (IZO), such as a molybdenum-based metal, chrome, titanium, or tantalum. Examples of multi-film structures include a chrome lower film and an aluminum upper film, and an aluminum lower film and a molybdenum upper film. However, the present invention is not limited thereto. The gate wirings (22, 24, and 26) may be formed of various conductive materials.

A gate insulating film 30 is formed on the gate wirings (22, 24, and 26). A semiconductor layer 40, which is formed of hydrogenated amorphous silicon or polycrystalline silicon, is disposed on the gate insulating film 30. The semiconductor layer 40 may have various shapes. For example, the semiconductor layer 40 may be an island-type or may be formed linearly. In the current exemplary embodiment, the semiconductor layer 40 is an island-type. When the semiconductor layer 40 is formed linearly, it may be disposed under a data line 62 and may extend onto the gate electrode 26.

Ohmic contact layers 55 and 56 formed of a material, such as a silicide or an n+ hydrogenated amorphous silicon heavily doped with n-type impurities, are disposed on the semiconductor layer 40. The ohmic contact layers 55 and 56 may have various shapes. For example, the ohmic contact layers 55 and 56 may be island-shaped or may be formed linearly. When the ohmic contact layers 55 and 56 are island-shaped, as in the current exemplary embodiment, they may be disposed under a drain electrode 66 and a source electrode 65. When the ohmic contact layers 55 and 56 are formed linearly, they may extend under the data line 62.

The data line 62 and the drain electrode 66 are formed on the ohmic contact layers 55 and 56 and the gate insulating film 30. The data line 62 extends across the gate line 22 to at least partially define a pixel or pixels. In particular, pixels may be at least partially defined by spaces in a matrix formed by the data line 62 and the gate line 22. The source electrode 65 branches off of the data line 62 and extends onto the semiconductor layer 40. A data line end 68 is formed at an end of the data line 62 and receives a data signal from another layer or an external source and delivers the received data signal to the data line 62. The data line end 68 has an increased width, as compared to the data line 62, for connection with an external circuit.

The drain electrode 66 is separated from the source electrode 65 and is disposed on the semiconductor layer 40, facing the source electrode 65. The drain electrode 66 forms a bar-shaped pattern, which is disposed on the semiconductor layer 40 and a drain electrode extension 67. The drain electrode extension 67 extends from the bar-shaped pattern and has a contact hole 76 formed therein. The data line 62, the data line end 68, the source electrode 65, and the drain electrode 66 are collectively referred to as data wirings.

A sustain electrode line 64 is formed on the gate insulating film 30. The sustain electrode line 64 extends parallel to the gate line 22 and passes through the middle of a pixel, thereby partitioning the pixel into two regions. In particular, the sustain electrode line 64 includes a first sustain electrode 64a that extends parallel to the gate line 22, and a pair of second sustain electrodes 64b branching off of the first sustain electrode 64a. The second sustain electrodes 64b may overlap edges of a first pixel electrode 82 and extend along edges of a pixel. A common voltage Vcom is applied to the sustain electrode line 64.

The data wirings (62, 65, 66, and 67) and the sustain electrode line 64 may be formed of chrome, a molybdenum-based metal, or a refractory metal, such as tantalum and titanium. In addition, the data wirings (62, 65, 66, and 67) and the sustain electrode line 64 may have a multi-film structure including a lower film (not shown), which is formed of refractory metal, and an upper film (not shown) disposed on the lower film, which is formed of a material having a low resistivity. Examples of multi-film structures include a chrome lower film and an aluminum upper film, and an aluminum lower film and a molybdenum upper film. Alternatively, the multi-film structure may be a three-film structure having molybdenum, aluminum, and molybdenum films.

At least a portion of the source electrode 65 overlaps the semiconductor layer 40. In addition, the drain electrode 66 faces the source electrode 65 across the gate electrode 26. At least a portion of the drain electrode 66 overlaps the semiconductor layer 40. The ohmic contact layers 55 and 56 are arranged between the semiconductor layers 40 and the source electrode 65, and between the semiconductor layer 40 and the drain electrode 66, to reduce the contact resistance there between.

A passivation film 70 formed of an insulating film is disposed on the data line 62, the drain electrode 66, the sustain electrode line 64, and an exposed portion of the semiconductor layer 40. The passivation film 70 may be formed of an inorganic material, such as a silicon nitride or a silicon oxide, an organic material having photosensitivity and superior planarization characteristics, or a low-k insulating material formed by plasma enhanced chemical vapor deposition (PECVD), such as a-Si:C:O or a-Si:O:F. The passivation film 70 may include a lower inorganic film and an upper organic film, in order to protect the exposed portion of the semiconductor layer 40, while taking advantage of the superior characteristics of an organic layer.

Contact holes 76 and 78, respectively exposing the drain electrode 66 and the data line end 68, are formed in the passivation film 70. Additionally, a contact hole 74 exposing the gate line end 24 is formed in the passivation film 70 and the gate insulating film 30.

The first pixel electrode 82 is formed on the passivation film 70. The first pixel electrode 82 is generally rectangular. The first pixel electrode 82 is electrically connected to the drain electrode 66 through the contact hole 76.

An auxiliary gate line end 86 and an auxiliary data line end 88 are formed on the passivation film 70 and are connected to the gate line end 24 and the data line end 68 by the contact holes 74 and 78, respectively. The first pixel electrode 82, the auxiliary gate line end 86, and the auxiliary data line end 88 may be formed of a transparent conductor, such as ITO or IZO, or a reflective conductor, such as aluminum. The auxiliary gate line end 86 and the auxiliary data line end 88 connect the gate line end 24 and the data line end 68 with an external device.

The first pixel electrode 82 is physically and electrically connected to the drain electrode 66 through the contact hole 76, to receive a data voltage from the drain electrode 66. A second pixel electrode 84 that is separated from the first pixel electrode 82 may further be provided. Unlike the first pixel electrode 82, which receives a voltage from the drain electrode 66, the second pixel electrode 84 is connected to the sustain electrode line 64 a via hole 85, to receive the common voltage Vcom from the sustain electrode line 64, as will be described later.

A region in which the first pixel electrode 82 is formed is referred to as a first region RGB, and a region in which the second pixel electrode 84 is formed is referred to as a second region T (transparent region). An alignment film (not shown) that can align the liquid crystal layer may be coated on the first pixel electrode 82, the auxiliary gate line end 86, the auxiliary data line end 88, and the passivation film 70.

Hereinafter, the relationship between the first and second pixel electrodes 82 and 84 and the sustain electrode line 64 of the LCD will be described with reference to FIGS. 3A, 3D, and 3E. As described above, the second sustain electrodes 64b of the sustain electrode line 64 are formed along opposing edges of the first pixel electrode 82.

Referring to FIGS. 3A and 3D, the second sustain electrodes 64b extend along two adjacent data lines 62 of a pixel and are partially overlapped by the first pixel electrode 82. Generally, a parasitic capacitance between each data line 62 and the first pixel electrode 82 generates vertical crosstalk. However, when the second sustain electrodes 64b are respectively disposed parallel and adjacent to the corresponding data lines 62 and are partially overlapped by the first pixel electrode 82, in a widthwise direction of the second sustain electrodes 64b, the parasitic capacitance can be reduced.

Referring to FIGS. 3A and 3E, the first sustain electrode 64a extends parallel to the gate line 22 and is separated from the gate line 22 by a predetermined gap. The first sustain electrode 64a partitions the pixel into the second region T and the first region RGB. That is, the first region RGB is at least partially defined by the corresponding gate line 22, the first sustain electrode 64a, and the second sustain electrodes 64b. The first sustain electrode 64a may be at least partially overlapped by the first pixel electrode 82.

The first pixel electrode 82 receives a voltage from the data line 62 and forms an electric field with a common electrode 90 disposed there above. The electric field rotates liquid crystals injected between the first pixel electrode 82 and the common electrode 90, in a certain direction. The second pixel electrode 84 is separated from the first pixel electrode 82 and is located in the second region T. The second pixel electrode 84 is connected to the sustain electrode line 64 by the via hole 85 and thus, receives the common voltage Vcom from the sustain electrode 64. That is, unlike the first pixel electrode 82, the second pixel electrode 84 maintains a constant voltage while in operation. Since liquid crystals adjacent to the second region T are not rotated by a constant electric field, when they are driven in a normally white (NW) mode, they allow light to pass there through.

Each pixel of the LCD includes the transparent second region T. Therefore, light transmittance may be increased significantly, as compared with conventional LCDs. Specifically, while conventional LCDs have a light transmittance of 5% or less, the present LCD can achieve a light transmittance of at least about 10%, depending on the area of the second region T. When the second region T occupies up to about 80% of the area of the pixel, a transparent display is formed that can be driven with a low power consumption, without a deterioration of display quality, and is viewable from two directions.

FIG. 4 is a layout view of the upper display panel 200. FIG. 5A is a layout view of the LCD including the lower display panel 100 shown in FIG. 3A and the upper display panel 200 shown in FIG. 4. FIG. 5B is a cross-sectional view of the LCD of FIG. 5A.

Referring to FIGS. 4 through 5B, a black matrix 94 for preventing leakage of light and red, green, and blue color filters 98 are formed on an insulating substrate 96 made of a transparent insulating material, such as glass. The red, green, and blue color filters 98, are formed in each pixel, are sequentially arranged. A common electrode 90 made of a transparent conductive material, such as ITO or IZO is formed on the color filters 98. The black matrix 94 is disposed on the lower display panel 100, so as to cover the gate line 22 and the data line 62.

Each of the color filters 98 transmits light in a predetermined wavelength range, thereby producing red, green, or blue light. As described above, each pixel in the current exemplary embodiment includes the first region RGB and the second region T, and each of the color filters 98 is located only in the first region RGB. Since the color filters 98 are not formed in the second region T, the second region T transmits incident light, thereby increasing the total light transmittance of each pixel. Consequently, a transparent display can be implemented. An is alignment film (not shown) may be coated on the common electrode 90.

As shown in FIG. 5B, the basic structure of the LCD is constructed by aligning and bonding the lower and upper display panels 100 and 200 together, and injecting the liquid crystal layer between the lower and upper display panels 100 and 200. When the first pixel electrode 82 receives a data voltage, an electric field is formed between the first pixel electrode 82 and the common electrode 90. Accordingly, liquid crystal particles between the first pixel electrode 82 and the common electrode 90 rotate in a certain direction. On the other hand, the second pixel electrode 84 receives the common voltage Vcom from the sustain electrode line 64. Therefore, liquid crystal particles between the second pixel electrode 84 and the common electrode 90 do not rotate and instead, maintain a certain orientation.

Due to this structure, the liquid crystal layer 150 may not be included in the second region T. That is, liquid crystals may be injected only into the first region RGB. In a boundary region between the first pixel electrode 82 and the second pixel electrode 84, a transparent partition film (not shown) may be formed.

The partition film blocks liquid crystals from being between the second pixel electrode 84 and the common electrode 90. Therefore, the region between the second pixel electrode 84 and the common electrode 90 is may be filled with a transparent organic material instead of liquid crystals. Here, a transparent organic material layer (not shown) may be formed to a height equal to that of the liquid crystal layer. When the height of the organic material layer is different from that of the liquid crystal layer, a step is formed between the two layers, thereby reducing the adhesion of the lower display panel 100 to the upper display panel 200. The transparent organic material layer increases the transmittance of a pixel by transmitting light therethrough.

A transparent organic material that forms the transparent organic material layer may contain one or more of styrene, methyl methacrylate, ethyl methacrylate, propyl methacrylate, isopropyl methacrylate, butyl metacrylate, isobutyl methacrylate, hexyl methacrylate, octyl metacrylate, 2-ethylhexyl methacrylate, decyl methacrylate, dodecyl methacrylate, methyl acrylate, ethyl acrylate, propyl acrylate, isopropyl acrylate, butyl acrylate, isobutyl acrylate, hexyl acrylate, octyl acrylate, 2-ethylhexyl acrylate, decyl acrylate, dodecyl acrylate, polyacrylic acid, polyvinyl alcohol, ethylene glycol, propylene glycol, diethylene glycol, 1,3-dihydroxy cyclobutane, 1,4-dihydroxycyclohexane, 1,5-dihydroxy cyclooctane, ethylene glycol monoglycidyl ether, ethylene glycol diglycidyl ether, ethylene glycol, propylene glycol, diethylene glycol, 1,3-dihydroxy cyclobutane, 1,4-dihydroxycyclohexane, 1,5-dihydroxy cyclooctane, polyethylene glycol, ethylene glycol monoglycidyl ether, ethylene glycol diglycidyl ether, ethylenediamine, 1,4-diaminobutane, 1,6-diaminohexane, 1,4-diaminobenzene, 2,6-diaminonaphthalene, melamine, adipic acid, 1,3-phthalic acid, 1,4-phthalic acid, fumaric acid, maleic acid, trimellitic acid, pyromellitic acid, maleic anhydride, phthalic anhydride, pyromellitic anhydride, tetramethoxysilane, tetraethoxysilane, tetrapropoxysilane, tetrabutoxysilane, methyltrimethoxysilane, ethoxy trimethoxysilane, butyltrimethoxysilane, methyltriethoxysilane, ethyltriethoxysilane, butyltriethoxysilane, 1-aminopropyltriethoxysilane, 1-chloropropyl triethoxysilane, and 1-glycidylpropyltriethoxysilane.

The LCD is completed by installing elements such as polarizing plates and a backlight in the above basic structure. The polarizing plates (not shown) are disposed respectively on both sides of the basic structure, and transmission axes of the polarizing plates are perpendicular to each other.

Figure 6:
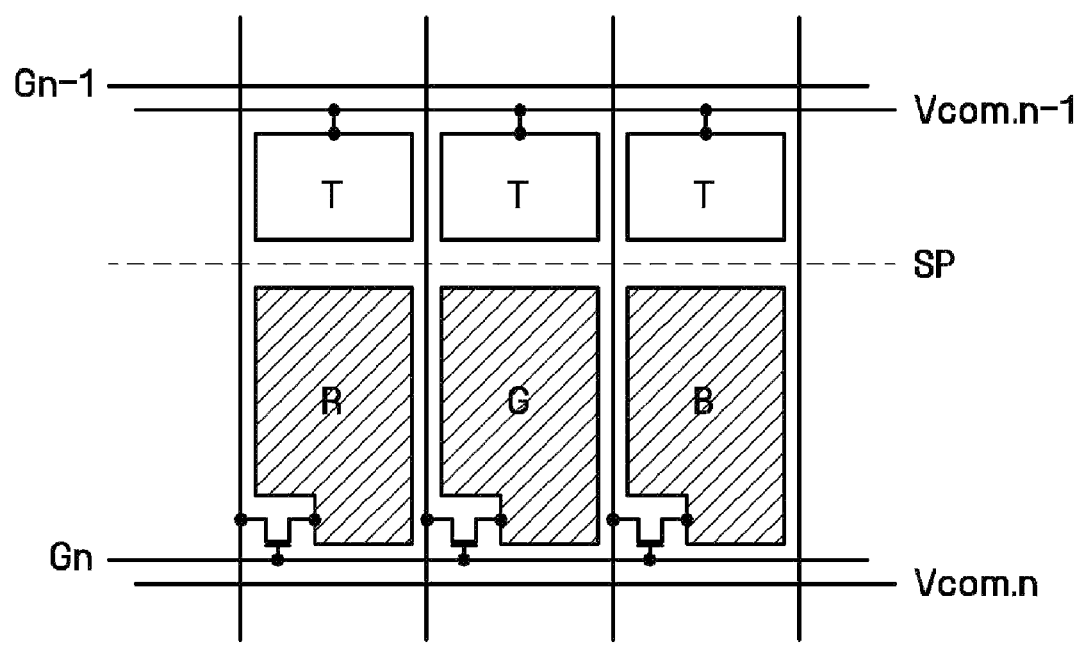
FIG. 6 is a schematic view of a pixel array of an LCD, according to a second exemplary embodiment of the present invention.
Figure 7:
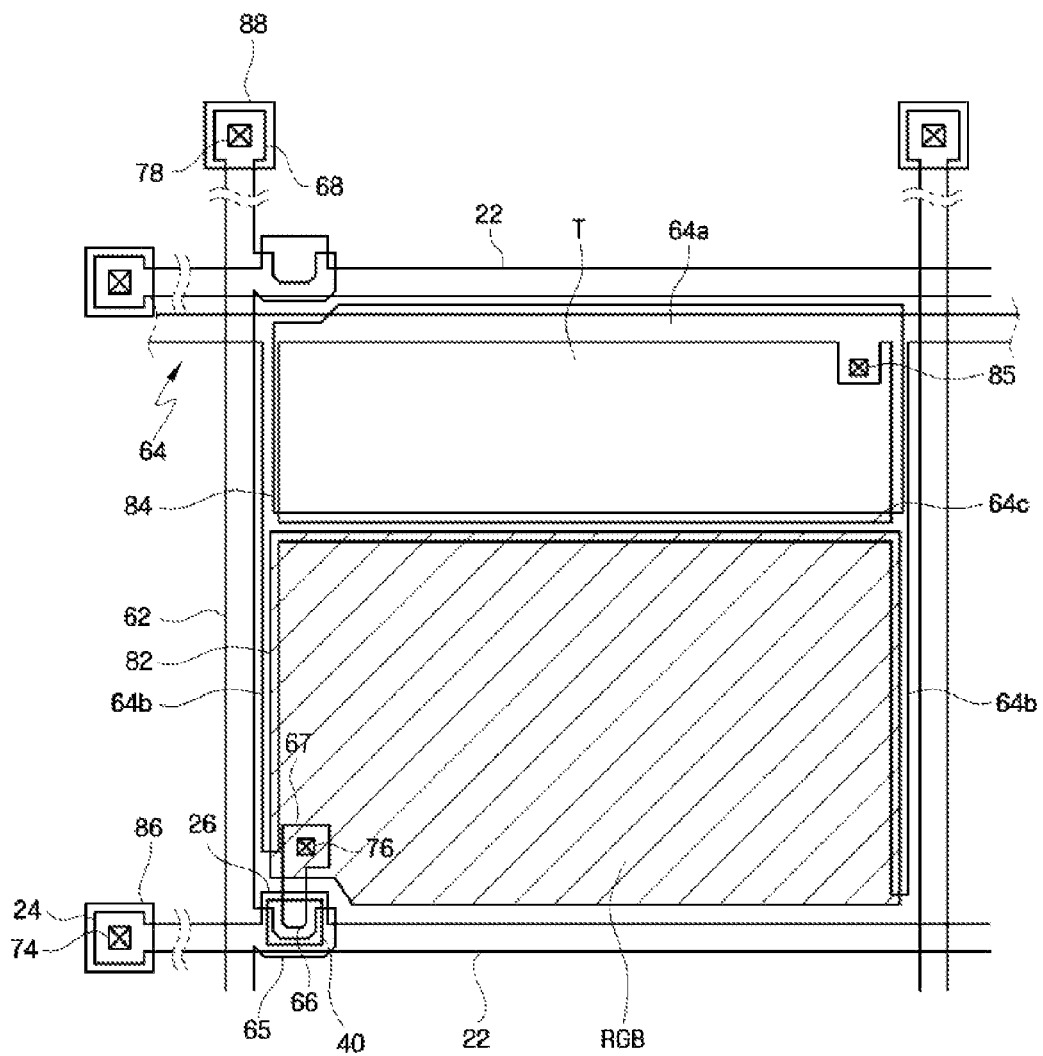
FIG. 7 is a layout view of a lower display panel of the LCD, according to the second exemplary embodiment of the present invention.

FIG. 6 is a schematic view of a pixel array of an LCD, according to a second is exemplary embodiment of the present invention. FIG. 7 is a layout view of a lower display panel of the LCD of FIG. 6. For simplicity, elements similar to those described above will have like reference numerals and will not be described in detail.

Referring to FIGS. 6 and 7, the pixel array is similar to the pixel array of the first exemplary embodiment, except for the position of a sustain electrode line and, accordingly, the configuration of a lower display panel. That is, since a sustain electrode line Vcom of FIG. 6 is adjacent to a gate line G, a pixel is partitioned into a first region and a second region by a partition film SP, rather than by the sustain electrode line Vcom. Alternatively, the pixel may be partitioned by a first pixel electrode 82 and a second pixel electrode 84, which are separated from each other, without using a partitioning element.

Referring to FIG. 7, a sustain electrode line 64 includes a first sustain electrode 64a that extends adjacent to a gate line 22 at an edge of the pixel, instead of passing through the middle of the pixel. The sustain electrode line 64 also include second sustain electrodes 64b that extend from the first sustain electrode, along opposing sides of the pixel. Therefore, each of the second sustain electrodes 64b extends parallel to the data line 62 and into the pixel. The first sustain electrode 64a is not overlapped by the first pixel electrode 82. Thus, the sustain electrode line 64 also includes a third sustain electrode 64c that extends between the second sustain electrodes 64b. The third sustain electrode 64c is partially overlapped by the upper part of the first pixel electrode 82, and divides the pixel into first and second regions RGB and T.

Figure 8:
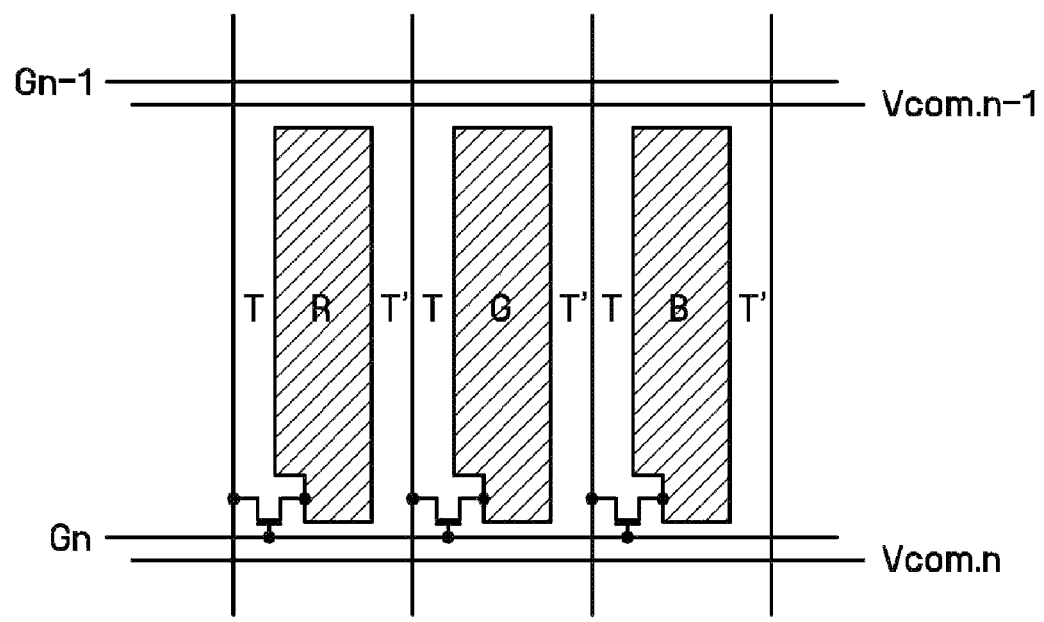
FIG. 8 is a schematic view of a pixel array of an LCD, according to a third exemplary embodiment of the present invention.
Figure 9:
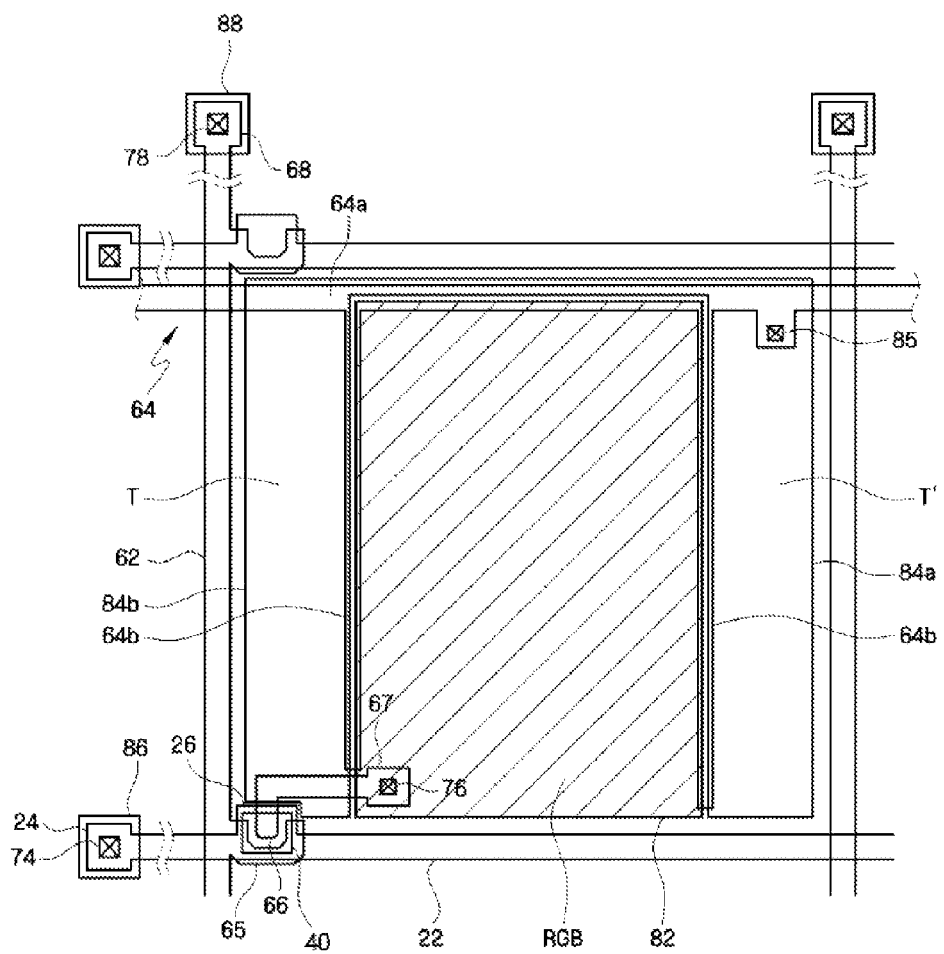
FIG. 9 is a layout view of a lower display panel of the LCD, according to the third exemplary embodiment of the present invention.

FIG. 8 is a schematic view of a pixel array of an LCD, according to a third exemplary embodiment of the present invention. FIG. 9 is a layout view of a lower display panel of the LCD of FIG. 8.

Referring to FIGS. 8 and 9, the pixel array is basically the same as the pixel array is of the second exemplary embodiment, except for the configuration of pixel electrodes. That is, unlike in the first and second exemplary embodiments, in the third exemplary embodiment of FIG. 8, the pixel is divided vertically into a first region RGB and second regions T and T', rather than in a horizontal direction. In other words, one pixel is partitioned into three regions. The first region RGB, in which a first pixel electrode 82 is formed, is disposed between the second regions T and T'.

Referring to FIG. 9, the first pixel electrode 82 extends parallel to the data line 62. The two second regions T and T' are disposed on opposing sides of the first pixel electrode 82. Thus, a pixel is partitioned into three regions. Second pixel electrode 84a and 84b are disposed on opposing sides of the first pixel electrode 82. A sustain electrode line 64 extends into the first pixel electrode 82. That is, the sustain electrode line 64 includes a first sustain electrode 64a that extend along one edge of the pixel, in a direction perpendicular to the data line 62. The sustain electrode line 64 also includes second sustain electrodes 64b that extend from the first sustain electrode4 64a, so as to divide the pixel into the first region RGB and the second regions T and T'. The first pixel electrode 82 and or the second pixel electrodes 84a and 84b may partially overlap the second sustain electrodes 64b.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) comprising:
   a first substrate;
   a gate line disposed on the first substrate;
   a data line extending across the gate line, so as to at least partially define a pixel;
   a thin-film transistor (TFT) disposed in the pixel and connected to the gate line and the data line;
   a sustain electrode line disposed on the substrate and comprising:
   a first sustain electrode that divides the pixel into a first region and a transparent second region; and
   second sustain electrodes that extend perpendicularly from the first sustain electrode, into the first region;
   a first pixel electrode connected to the TFT, disposed in the first region, and overlapping the second sustain electrodes;
   a second substrate disposed facing the first substrate; and
   a color filter disposed on the second substrate so as to cover the first region and expose the second region.

2. The LCD of claim 1, wherein the first sustain electrode is parallel to the gate line.

3. The LCD of claim 1, wherein the second sustain electrodes are parallel to the data line.

4. The LCD of claim 1, wherein the second sustain electrodes extend along opposing edges of the first region.

5. The LCD of claim 1, further comprising a second pixel electrode disposed in the second region.

6. The LCD of claim 1, further comprising
   a common electrode disposed on the second substrate.

7. The LCD of claim 6, wherein the common electrode is configured to receive a first voltage and the sustain electrode line is configured to receive a second voltage that is equal to the first voltage.

8. The LCD of claim 1, further comprising a liquid crystal layer interposed between the first substrate and the second substrate.

9. The LCD of claim 8, wherein the liquid crystal layer faces only the first region.

10. The LCD of claim 1, further comprising:
    a liquid crystal layer interposed between the first substrate and the second substrate and facing the first region; and
    a transparent organic material disposed between the first substrate and the second substrate and facing the second region.

11. The LCD of claim 10, further comprising a second pixel electrode disposed in the second region.

12. The LCD of claim 11, wherein the second pixel electrode is connected to the sustain electrode line through a hole.

13. The LCD of claim 11, wherein the second pixel electrode is configured to receive a common voltage, such that liquid crystals located between the common electrode and the second pixel electrode maintain a certain orientation.

14. The LCD of claim 11, further comprising a partition film disposed between the first and second substrates and extending between the first and second pixel electrodes.

15. The LCD of claim 14, wherein the partition film is an insulator.

16. The LCD of claim 14, wherein the partition film is transparent.

17. The LCD of claim 1, wherein an area of the second region is less than about 80% of the total area of the pixel.

18. The LCD of claim 1, wherein the pixel has a light transmittance of at least about 10%.

19. A liquid crystal display (LCD) comprising:
    a first substrate;
    a gate line disposed on the first substrate;
    a data line extending across the gate line, so as to at least partially define a pixel;
    a thin-film transistor (TFT) disposed in the pixel and connected to the gate line and the data line;
    a sustain electrode line disposed on the first substrate and comprising:
    a first sustain electrode extending along an edge of the pixel;
    second sustain electrodes that extend perpendicularly from the first sustain electrode along opposing edges of the pixel; and
    a third sustain electrode that extends between the second sustain electrodes to divide the pixel into a first region and a transparent second region;
    a first pixel electrode connected to the TFT, disposed in the first region, and overlapping the second sustain electrodes and the third sustain electrode;
    a second substrate disposed facing the first substrate; and
    a color filter disposed on the second substrate so as to cover the first region and expose the second region.

20. The LCD of claim 19, further comprising a second pixel electrode disposed in the second region.

21. A liquid crystal display (LCD) comprising:
    a first substrate;
    a gate line disposed on the first substrate;
    a data line extending across the gate line, so as to at least partially define a pixel;
    a thin-film transistor (TFT) disposed in the pixel and connected to the gate line and the data line;
    a sustain electrode line disposed on the first substrate and comprising:
    a first sustain electrode extending along an edge of the pixel; and
    second sustain electrodes that extend perpendicularly from the first sustain electrode, into the pixel;
    a first pixel electrode connected to the TFT, disposed between the second sustain electrodes;
    two second pixel electrodes disposed in the pixel on opposing sides of the first pixel electrode;
    a second substrate disposed facing the first substrate; and
    a color filter disposed on the second substrate so as to cover the first pixel electrode and expose the two second pixel electrodes.

22. The LCD of claim 21, wherein the first pixel electrode and the second pixel electrodes overlap the second sustain electrodes.

* * * * *